United States Patent Office 3,321,495
Patented May 23, 1967

3,321,495
METHOD OF ENOL-ACETYLATING 3-KETO STEROIDS
Narasimha Rao Pemmaraju and Ben E. Edwards, San Antonio, Tex., assignors to Southwest Foundation for Research and Education, San Antonio, Tex., a corporation of Texas
No Drawing. Filed May 8, 1964, Ser. No. 366,168
20 Claims. (Cl. 260—397.2)

This invention relates to methods for converting 3-keto steroids to enol acetates and is particularly concerned with providing a new method for rapidly and efficiently carrying out such conversions under mild conditions.

Prior to this invention, methods for enol-acetylation of 3-keto steroids were characterized by excessively long reaction times and/or undesirable reaction temperatures. As a result, such methods are typically awkward and uneconomic and/or attended by unwanted side reactions. Moreover, the percentage yield from these reactions is characteristically low.

This invention provides a reltaively side-reaction-free, highly specific enol-acetylation method characterized by mild conditions and particularly useful in preparing enol-acetates such as those employed in protecting the 3-ketone function of steroid intermediates during modification of other sites, or as intermediates for further synthetic operations on the 3-ketone function.

In general, the method of the present invention comprises dissolving the 3-keto steroid to be treated in a reagent solution comprising ethyl acetate, acetic anhydride and perchloric acid and standing the reagent-steroid solution for several minutes at room temperature and atmospheric pressure to complete the acetylation reaction. When the reaction is complete, the solution is neutralized, as by washing with saturated sodium bicarbonate, and phase separated to facilitate isolation of the enol-acetate reaction product by recrystallization.

In practice, it has been found that the yields of this methods are excellent and the physical constants in conformity with accepted standards.

Conversion of delta⁴-3-keto steroids with the method of this invention is well represented by the following reaction.

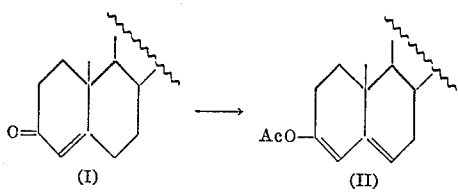

In this reaction, the delta⁴-3-keto steroid (I) typified by progesterone is dissolved in the ethyl acetate-acetic anhydride-perchloric acid reagent, and let stand for five minutes at room temperature and atmospheric conditions to produce the enol-acetate (II).

The enol-acetates of type II find particular utility as intermediates in the conversion of delta⁴-3-keto steroids to delta⁵-3β-hydroxy steroids:

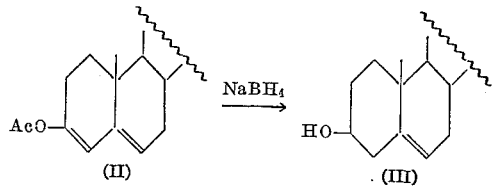

Conversion of saturated 3-keto steroids with the method of the invention is illustrated by the following reactions:

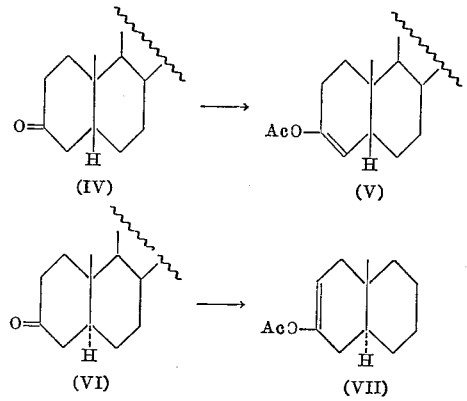

In this reaction, a saturated 3-keto-5β-steroid (IV) such as 5β-cholestanone may be readily converted to the enol-acetate (V) by dissolution and standing in the reagent at room conditions; a saturated 3-keto-5α-steroid (VI) such as 5α-cholestanone may be readily converted to the enol-acetate (VII) by dissolution and standing in the reagent at room conditions.

This type of reaction finds particular utility in the preparation of either the 4-halo-steroid (VIII) from V by halogenation:

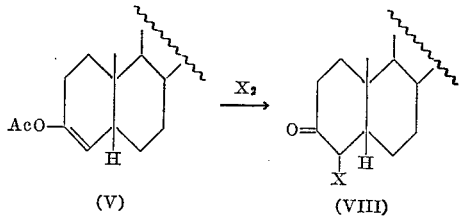

Or the 2-halo-steroid (IX) from VII:

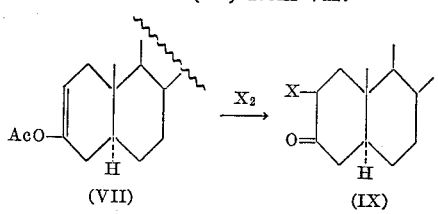

Ketone functions at positions other than 3 (such as 17, 20, 11, 7 and 1 ketones) are not affected by the reagent under the specified conditions. All alcohol functions including the normally unreactive 17α and 11β hydroxyls are converted to their acetates.

More particular understanding of the invention will be had by reference to the following specific examples of its utilization.

Example I

A quantity of reagent comprising ethyl acetate, acetic anhydride and perchloric acid was prepared by admixing 50 ml. of absolute ethyl acetate and 0.05 ml. of 72% perchloric acid (0.575 mmole). Ten ml. of this solution was then added to 30 ml. of absolute ethyl acetate and 4.8 ml. (51 mmole) of acetic anhydride. The total solution was then made up to 50 ml. with ethyl acetate to give a 1 m. acetic anhydride concentration and a $10^{-3}$ m. perchloric acid concentration in ethyl acetate.

Using this reagent a quantity of 4-cholesten-3-one was acetylated in the following manner:

103 mg. of 4-cholesten-3-one was dissolved in 10 ml. of reagent and let stand for five minutes at room temperature and atmospheric pressure. The solution was then washed into 15 ml. of a saturated sodium bicarbonate solution in a separatory funnel with additional ethyl acetate. The ethyl acetate layer was then phase separated, dried over anhydrous sodium sulfate and evaporated under a stream of nitrogen. The enol-acetate reaction product was then recrystallized from methylene chloride-methanol to yield 80 mg. (72%) of 3-acetoxy-3,5-cholestadiene having a melting point range of 70–76° C. The analytical sample had M.P. 75–77° (lit. M.P. 76–78°, W. G. Dauben and J. F. Eastham, J. Am. Chem. Soc., 73, 3260 (1951)).

*Analysis.*—Calc'd for $C_{29}H_{46}O_2$: C, 81.63; H, 10.86. Found: C, 81.69; H, 10.69.

Example II

Using the reagent of Example I, a quantity of 4-androsten-3,17-dione was acetylated in the following manner:

108 mg. of 4-androsten-3,17-dione was dissolved in 10.8 ml. of reagent and let stand for 5 minutes at room temperature and atmospheric pressure. The solution was then washed into 15 ml. of a saturated sodium bicarbonate solution in a separatory funnel with additional ethyl acetate. The ethyl acetate layer was then phase separated, dried over anhydrous sodium sulfate and evaporated under a stream of nitrogen. The enol-acetate reaction product was then recrystallized from methanol containing a trace of pyridine to yield 96 mg. (81%) of 3-acetoxy-3,5-androstadiene-17-one, M.P. 123–125° C.

*Analysis.*—Calc'd for $C_{21}H_{48}O_3$; C, 76.79; H, 8.59. Found: C, 76.66; H, 8.47.

Example III

Using the reagent of Example I, a quantity of progesterone was converted to its 3-enol-acetate-20-semicarbazone as follows:

4.0 mg. of progesterone was dissolved in 0.5 ml. of the reagent and let stand for 5 minutes at room temperature and atmospheric pressure. The reaction was quenched by the addition of 0.5 ml. of saturated aqueous sodium bicarbonate solution and the two phase system was thoroughly mixed. The upper (ethyl acetate) layer was transferred by pipette and percolated through a small tube (8 mm.), plugged at one end with cotton and packed with about 1 inch of anhydrous sodium sulfate. The aqueous layer was washed with 3× 1 ml. portions of ethyl acetate and the washings were passed through the tube and combined with the first ethyl acetate solution. A 1 ml. portion of methanol containing a trace of pyridine was added to destroy any residual acetic anhydride, and the solution was evaporated to dryness under vacuum in a nitrogen atmosphere on a water bath at 70°. The residue was warmed with a solution of 5 mg. of semicarbazide hydrochloride and 5 mg. of sodium acetate trihydrate in 0.5 ml. of 80% aqueous methanol at 80° for 15 minutes, then cooled and the precipitate collected by centrifugation. The solid was washed with hot water, and dried to give 5.1 mg. (97%) of snow white solid, M.P. 245–250° (dec.). The infrared spectrum of this material was identical with that of an authentic sample of 3-acetoxypregna-3,5-diene-20-one-20-semicarbazone (lit., M.P. 255–257°, P. N. Rao and L. R. Axelrod, J. Org. Chem., 26, 1607 (1961)).

Example IV

Using the reagent of Example I, a quantity of 17α-hydroxyprogesterone was acetylated in the following manner:

52.7 mg. of 17α-hydroxyprogesterone was dissolved in 5 ml. of reagent and let stand for 5 minutes at room temperature and atmospheric pressure. The solution was then washed with 2 ml. of a saturated sodium bicarbonate solution and the upper (ethyl acetate) layer was percolated through a small (8 mm.) tube, plugged at one end with cotton and packed with about 1.5 inches of anhydrous sodium sulfate mixed with a small amount of anhydrous potassium carbonate. The aqueous layer was washed with 3× 2 ml. portions of ethyl acetate and the washings were passed through the tube and combined with the first ethyl acetate solution. A 5 ml. portion of absolute methanol containing a trace of pyridine was added to destroy any residual acetic anhydride and the solution was evaporated to dryness under vacuum in a nitrogen atmosphere on a water bath at 80° to give a crude yield of 66 mg. (100%) of 3, 17α-diacetoxypregna-3,5-diene-20-one, M.P. 190–204° (dec.). The infrared spectrum of this material was identical with that of an authentic sample. The analytical sample crystallized from methanol containing a trace of pyridine, M.P. 196–204° (dec.).

*Analysis.*—Calc'd for $C_{25}H_{34}O_5$: C, 72.43; H, 8.27. Found: C, 71.86; H, 8.20.

Example V

Using the reagent of Example I, 59 mg. of 11β-hydroxy-4-androstene-3,17-dione was dissolved in 6 ml. of reagent and let stand at room temperature and atmospheric conditions for 15 minutes. The reaction mixture was then worked up by the procedure outlined in Example IV to give 76 mg. (100%) of crude 3, 11β-diacetoxy-3,5-androstadiene-17-one, M.P. 135–150°. The analytical sample was crystallized from ether, M.P. 140–158°.

*Analysis.*—Calc'd for $C_{23}H_{30}O_5$: C, 71.48; H, 7.83. Found: C, 71.84; H, 8.01.

Example VI

Using the reagent of Example I, 99 mg. of testosterone was dissolved in 9 ml. of reagent and let stand at room temperature and atmospheric conditions for 5 minutes. The reaction mixture was then worked up by the procedure outlined in Example IV to give 126 mg. (98%) of crude 3, 17β-diacetoxy-3,5-androstadiene, M.P. 148–156°. The analytical sample was crystallized from ether, M.P. 152–156°.

*Analysis.*—Calc'd for $C_{23}H_{32}O_4$: C, 74.16; H, 8.66. Found: C, 74.65; H, 8.84.

Example VII

Using the reagent of Example I, 65.5 mg. of 19-nortestosterone was dissolved in 6 ml. of reagent and let stand at room temperature and atmospheric conditions for 5 minutes. The reaction mixture was then worked up by the procedure outlined in Example IV to give 79.5 mg. (93%) of crude 3, 17β-diacetoxy-3,5-estradiene, M.P. 150–166°. The analytical sample was crystallized from methanol containing a trace of pyridine, M.P. 156–168°.

*Analysis.*—Calc'd for $C_{22}H_{30}O_4$: C, 73.71; H, 8.44. Found: C, 73.41; H, 8.43.

Example VIII

Reagent was prepared by admixing 30.0 ml. of absolute ethyl acetate 0.05 ml. of 72% perchloric acid (0.575 mmole) and 4.8 ml. (51 mmole) of acetic anhydride. The total solution was then made up to 50.0 ml. with ethyl acetate to give a 1 m. acetic anhydride concentration and a $10^{-2}$ m. perchloric acid concentration.

Using this reagent:

53 mg. of 5α-cholestanone was dissolved in 5 ml. of reagent and let stand for five minutes at room temperature and atmospheric pressure. The solution was then washed into 5 ml. of a saturated sodium bicarbonate solution in a separatory funnel with additional ethyl acetate. The ethyl acetate layer was then phase separated, dried over anhydrous sodium sulfate and evaporated under a stream of nitrogen. The 3-acetoxy-5α-cholest-2-ene was then recrystallized from methanol containing a trace of pyridine to yield 50 mg. (86%) of enol-acetate having a melting point of 88–98° C. The analytical sample was crystallized from ethylene chloride-methanol, M.P. 92–98° (lit. M.P. 93–980, C. Djerassi, N. Finch, R. C. Cookson and C. W. Bird, J. Am. Chem. Soc., 82, 5488 (1960)).

*Analysis.*—Calc'd for $C_{29}H_{46}O_2$: C, 81.24; H, 11.29. Found: C, 80.85; H, 11.23.

*Example IX*

Using the reagent of Example VIII, a quantity of 5β-cholestanone was acetylated in the following manner:

65 mg. of impure 5β-cholestanone was dissolved in 7 ml. of reagent and let stand for 8 minutes at room temperature and atmospheric pressure. The solution was then worked up by the procedure outlined in Example IV to give an oily mixture of products, which on the basis of its infrared spectrum and thin layer chromatographic behavior consisted principally of 3-acetoxy-5β-cholest-4-ene with minor amounts of the starting ketone and the delta²-enol-acetate (lit., W. G. Dauben, R. A. Micheli and J. F. Eastham, J. Am. Chem. Soc., 74, 3852 (1952)).

The invention has also been employed to produce 19-nor-3-acetoxypregna-3,5-diene-20-one; 3,11β,17α-triacetoxypregna-3,5-diene-20-one; 3-acetoxyadrosta-2-ene-17-one; 3-acetoxypregna-2-ene-20-one.

In practice, it has been found that ethyl acetate, acetic anhydride and perchloric acid are all important constituents of the reagent. However, the proportions in which these constituents are combined has not been found critical to operability of the method. Thus, proportioning of the reagent constituents seems limited only by stoichiometric considerations.

Nothwithstanding, for optimum results, it is preferred that the acetic anhydride be present in concentrations of about 1 m./l. for treatment of both deta⁴-3-keto steroids and the saturated 3-keto steroids. On the other hand, it has been found preferable to vary the perchloric acid concentration from about $10^{-3}$ m./l. for delta⁴-3-keto steroids to $10^{-2}$ m./l. for saturated 3-keo-steroids. However, optimum reaction time and minimum side reaction is considered to be had at perchloric concentrations ranging from about $10^{-1}$ to $10^{-5}$ m./l.

It is to be understood that the foregoing general and particular description of specific embodiments of the present invention is given solely to facilitate understanding of the invention by those skilled in the art to which it pertains. Thus, such description may not be construed to limit the scope of the invention which will admit of other equally effective embodiments.

What is claimed is:

1. The method of enol-acetylating 3-keto steroids, comprising;
    treating a 3-keto steroid with a reagent comprising an admixture of ethyl acetate, acetic anhydride and perchloric acid.

2. The method of enol-acetylating 3-keto steroids, comprising;
    admixing a 3-keto steroid with a reagent comprising ethyl acetate, acetic anhydride and perchloric acid;
    and, standing said admixture for about five to fifteen minutes.

3. The method of enol-acetylating 3-keto steroids, comprising;
    admixing a 3-keto steroid with a reagent comprising ethyl acetate, acetic anhydride and perchloric acid;
    standing said admixture for about five to fifteen minutes;
    neutralizing said admixture;
    and, isolating the reaction product.

4. The method of enol-acetylating 3-keto steroids, comprising;
    admixing a 3-keto steroid with a reagent comprising a major proportion of ethyl acetate, a minor proportion of acetic anhydride and a trace amount of perchloric acid;
    standing said admixture at room temperature and atmospheric pressure for about five to fifteen minutes;
    washing said admixture with a sodium bicarbonate solution;
    phase separating said admixture and said solution;
    and, isolating the enol-acetate reaction product from said admixture by recrystallization.

5. The method of claim 4, wherein;
    said reagent and keto-steroid are admixed in a proportion of about 1 ml. to 10 mg. respectively.

6. The method of claim 4, wherein;
    said acetic anhydride is present in said reagent in a concentration of about 1.0 m./l.

7. The method of claim 4, wherein;
    said perchloric acid is present in said reagent in a concentration of between about $10^{-5}$ to $10^{-1}$ m./l.

8. The method of claim 4, wherein:
    said 3-keto steroid comprises progesterone;
    and, said reaction product comprises 3-acetoxypregna-3,5 diene-20-one.

9. The method of claim 4, wherein:
    said 3-keto steroid comprises 4-cholesten-3-one;
    and, said reaction product comprises 3-acetoxycholesta-3,5-diene.

10. The method of claim 4, wherein:
    said 3-keto steroid comprises 4-androsten-3,17-dione;
    and, said reaction product comprises 3-acetoxyandrosta-3,5-diene-17-one.

11. The method of claim 4, wherein:
    said 3-keto steroid comprises 11β-hydroxy-3,17-dione;
    and, said reaction product comprises 3,11β-diacetoxyandrosta-3,5-diene-17-one.

12. The method of claim 4, wherein:
    said 3-keto steroid comprises testosterone;
    and, said reaction product comprises 3,17β-diacetoxyandrosta-3,5-diene.

13. The method of claim 4, wherein:
    and 3-keto steroid comprises 19 nortestosterone;
    and, said reaction product comprises 3,17β-diacetoxyestra-3,5-diene.

14. The method of claim 4, wherein:
    said 3-keto steroid comprises 19-norprogesterone;
    and, said reaction product comprises 19-nor-3-acetoxypregna-3,5-diene-20-one.

15. The method of claim 4, wherein:
    said 3-keto steroid comprises 17α-hydroxyprogesterone;
    and, said reaction product comprises 3,17α-diacetoxypregna-3,5-diene-20-one.

16. The method of claim 4, wherein:
    said 3-keto steroid comprises 11β,17α-dihydroxyprogesterone;
    and, said reaction product comprises 3,11β,17α-triacetoxypregna-3,5-diene-20-one.

17. The method of claim 4, wherein:
    said 3-keto steroid comprises 5β-cholestanone;
    and, said reaction product comprises 3-acetoxy-5β-cholest-3-ene.

18. The method of claim 4, wherein:
    said 3-keto steroid comprises 5α-cholestanone;
    and, said reaction product comprises 3-acetoxy-5α-cholest-2-ene.

19. The method of claim 4, wherein:
    said 3-keto steroid comprises androstan-3,17-dione;

and, said reaction product comprises 3-acetoxy-androsta-2-ene-17-one.

20. The method of claim 4, wherein:
said 3-keto steroid comprises pregnan-3,20-dione; and, said reaction product comprises 3-acetoxypregna-2-ene-20-one.

References Cited by the Examiner

UNITED STATES PATENTS 3,183,158   5/1965   Bruckner _____ 167—6

OTHER REFERENCES

Berkoz et al.: "Journal Chem. Soc." (1962), pages 1323–1329.

Iriarte et al.: Journal American Chem. Soc., vol. 80 (1958), page 1605 relied on.

LEWIS GOTTS, *Primary Examiner.*

ELBERT L. ROBERTS, *Assistant Examiner.*